Patented Sept. 3, 1935

2,013,343

UNITED STATES PATENT OFFICE 2,013,343

PROCESS FOR CANNING FOODS

Ernest E. Follin, Chicago, Ill., assignor to Standard Oil Company, Chicago, Ill., a corporation of Indiana No Drawing. Application February 12, 1932, Serial No. 592,663

7 Claims. (Cl. 99—8)

This invention relates to a process for sealing containers, such as metallic cans for preserving food-stuffs, whereby the foods are prevented from losing their delicate flavor and becoming contaminated with undesirable flavors.

Food products are commonly preserved in containers, such as tinned cans and the like, by placing the food in the open container, then preparatory to sealing the top on the container, a cementitious material comprising rubber and the like in a suitable solvent is placed on the metal surfaces that are to form a part of the air-tight seal of the container. The top is then placed on the can, and the coated surfaces are crimped by any conventional means into an air-tight or hermetical seal. The cementitious material is retained in the folds and thereby serves as a lute for the seal.

The cement used to lute the air-tight seal generally comprises an adhesive material such as rubber or a resin dissolved in a suitable solvent such as chloroform, benzene and benzine and linseed oil. Among the suitable solvents used, petroleum naphthas have proven to be most desirable. After the liquid cementitious composition has been applied to the can, the naphtha evaporates and leaves a thin coating of cement uniformly spread over the surfaces that are to be crimped or rolled into a seal. This method of sealing cans has proven to be very successful and eliminates the expensive and cumbersome process of soldering the tops on the can, but one serious defect in the process has materially hindered its wide spread commercial adoption.

I have observed that the food stuffs in the sealed cans lose their flavor and develop a peculiar disagreeable flavor which I call a malflavor. Frequently it is necessary to condemn and destroy large quantities of canned foodstuffs that have been sealed by the use of the rubber and solvent composition on account of the malflavors that develop therein. Attempts have been made to remedy this defect by using highly purified solvents and cementitious materials, but such efforts have been unsuccessful.

It is an object of this invention to provide a way for sealing the cans whereby the delicate and sensitive flavors of the foods will be retained after canning, and consequently eliminate the malflavor that develops after sealing the cans with the solvent and cementitious composition.

I have found that by incorporating small quantities of neutralizing agents in the cementitious composition used to seal the can, the malflavor is prevented from developing in the foodstuffs contained therein.

A composition comprising the following ingredients will form an excellent cement for sealing containers and will prevent the development of malflavors in the foodstuffs within the sealed containers.

Example I

| | Per cent |
|---|---|
| Rubber, about | 20 |
| Naphtha of 100° F. initial B. P. and 300° F. maximum B. P. | 80 |
| Pyrogallol (neutralizing agent) | .005 |

The amount of rubber used in the cementitious composition may be varied within a wide range, but preferably within the range of 1 to 40%. Also, any suitable type of rubber or rubber like material may be used, for example, gutta percha, chicle India rubber, crude rubber, caoutchouc, etc. Furthermore, other cementitious materials may be used in combination with the rubber, for example, natural gums, rosin, casein, shellac, paraffin wax, gelatin, etc. may be successfully incorporated into the rubber cementitious composition. It should be understood that I may use my neutralizing agents in any type of cementitious material, for example, synthetic resins may be the base of the cementitious material instead of rubber, but I have found the rubber cements to be more satisfactory.

A further example of a suitable cementitious material is as follows:

Example II

| | Per cent |
|---|---|
| Gutta percha | 10 |
| Chicle | 10 |
| Naphtha about | 80 |
| Methyl aminophenol | .005 |

The neutralizing agents or malflavor inhibitors which I have found to be suitable are organic compounds, and particularly organic compounds of the phenolic, phenolic amine, substituted phenolic amine and amine type. The following compounds may be suitably used for the purpose of my invention: monohydroxy aryl compounds, for example, phenol, alpha naphthol and beta naphthol; dihydroxy aryl compounds, for example, resorcinol and catechol; trihydroxy aryl compounds, for example, pyrogallol and phloroglucinol; amino hydroxy aryl compounds, for example, aminophenols, aminonaphthols, ortho-meta- or para-benzyl aminophenol, phenyl aminophenol, ortho-meta or paramethyl aminophenol; aryl amines, for example, naphthylamines, alpha naphthylamines, phenylene diamine, and other homologues and isologues of the above compounds.

Some of the above compounds are somewhat toxic when taken in relatively large quantities, but the amount used for the purpose of my invention is impotent. Furthermore, only a minute portion of the neutralizing agent used comes in contact with the food product.

These neutralizing agents are preferably dissolved in the solvent, or naphtha, before dissolving the cementitious material therein, or the compounds may be added to the mixture of solvent and cementitious materials.

Any suitable solvent may be used as a vehicle for the rubber or cementitious material, but I have found that naphtha with an initial boiling point of about 100° F. and a maximum boiling point of about 300° F. is a very suitable solvent. Also, naphthas that have an initial boiling point within the range of 95 to 130° F. and a maximum boiling point within the range of 250 to 350° F. may be used as a suitable solvent.

When a solution of cementitious material and neutralizing agent is applied to the rim of the can, the solvent evaporates and leaves a superficial coating of cementitious material which contains the neutralizing agent dispersed therein. After the top and coated rim have been crimped to form an air-tight seal, a small quantity of the mixture of cementitious material and neutralizing agent is retained in the seal as a lute. The food products within the can may remain therein for a long period of time without loss of their delicate flavor or taste. The action of the neutralizing agents is not clearly understood and I do not limit myself to any theory for explanation, but the use of neutralizing agents in the lute or cementitious material prevents the development of malflavors or loss of delicate flavor of the food products.

While I have described my invention by the use of specific examples it is not intended that such details shall be regarded as limitations upon the scope of the invention except insofar as included in the accompanying claims.

I claim:

1. An improvement in the process of preventing malflavors from developing in food products contained in a sealed container which comprises the step of luting the seals of said container by applying thereto a petroleum naphtha solution of a rubbery cementitious material said solution having a small quantity of a hydroxy aryl compound dissolved therein.

2. The process as in claim 1 wherein the hydroxy aryl compound is a poly-hydroxy benzene.

3. The process as in claim 1 wherein the hydroxy aryl compound is an amino hydroxy aryl compound.

4. The process as in claim 1 wherein the hydroxy aryl compounds is a naphthol.

5. An improvement in the process of preventing malflavors from developing in food products contained in a sealed container which comprises the step of luting the seals of said container by applying thereto a petroleum naphtha solution of a rubbery cementitious material, said solution having a small quantity of alpha naphthol dissolved therein.

6. An improvement in the process of preventing malflavors from developing in food products contained in a sealed container which comprises the step of luting the seals of said container by applying thereto a petroleum naphtha solution of a rubbery cementitions material, said solution having a small quantity of para benzyl aminophenol dissolved therein.

7. An improvement in the process of preventing malflavors from developing in food products contained in a sealed container which comprises the step of luting the seals of said container by applying thereto a petroleum naphtha solution of a rubbery cementitious material, said solution having a small quantity of catechol dissolved therein.

ERNEST E. FOLLIN.